Jan. 4, 1966  E. FRANK  3,227,129
INDICATING APPARATUS
Filed Oct. 17, 1963
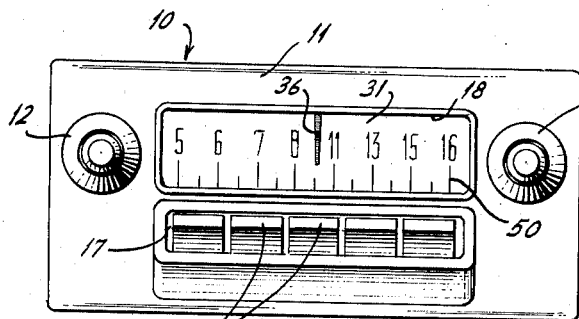
FIG. 1.
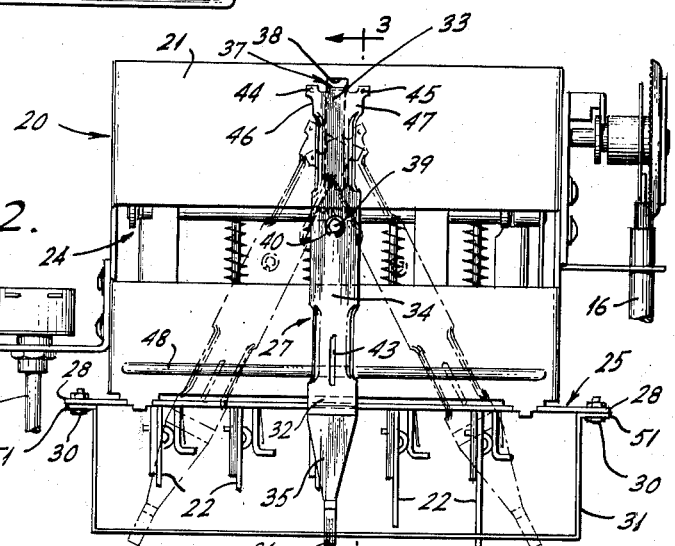
FIG. 2.
FIG. 3.
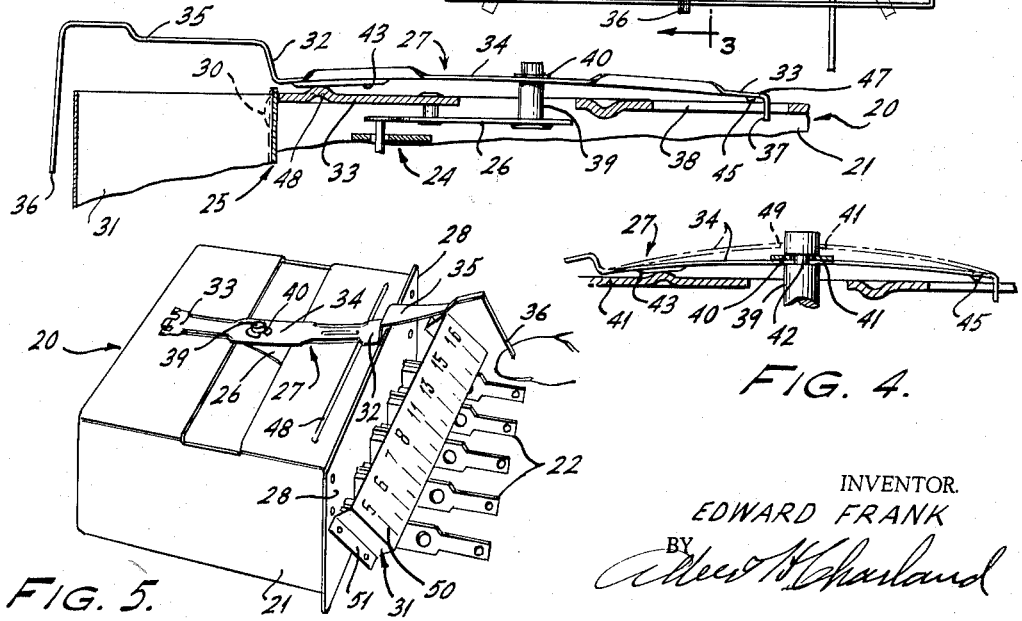
FIG. 4.
FIG. 5.
INVENTOR.
EDWARD FRANK
BY
ATTORNEY

United States Patent Office 3,227,129
Patented Jan. 4, 1966

3,227,129
INDICATING APPARATUS
Edward Frank, Glenolden, Pa., assignor to Philco Corporation, Philadelphia, Pa., a corporation of Delaware
Filed Oct. 17, 1963, Ser. No. 316,916
5 Claims. (Cl. 116—124.1)

The present invention relates to indicating apparatus and more particularly to indicator structure employed in tuning means for radio receivers. More specifically the invention has to do with a novel and improved indicator adapted to cooperate with a scale for giving visual indication of the tuning of a radio receiver designed to be tuned automatically by operation of push buttons.

Currently, popular types of tuners for radio receivers, particularly those adapted for use in vehicles, are provided with a pointer adapted to slide over a straight line scale, the latter being disposed immediately above and perpendicular to a row of push button slides. This arrangement is preferred because it contributes to the provision of a compact unit suitable for association with the vehicle instrument panel. Such arrangement however gives rise to problems and difficulties particularly with respect to mounting and assembling the pointer and scale, and it is a primary object of this invention to solve these problems and to overcome these difficulties. Toward that end, the invention provides an indicator of novel construction which facilitates its mounting and which simplifies its association with a scale.

Moreover, in the manufacture of tuning apparatus of the above mentioned type, it is customary to mount the scale member on the tuner housing after the pointer member has been installed thereon and immediately prior to attachment of the front cover plate to the housing. This procedure is desired in order to protect the scale against damage. However, because of the relative position of the pointer element and the push button slides, the placement and attachment of the scale member on the tuner housing necessitates tedious handling and demands utmost care to avoid injury to either or both of the pointer element and scale member. In an effort to eliminate these drawbacks it has heretofore been the custom to utilize a two-part indicator member including a pointer designed to be detached from the main body of the member to allow placement and mounting of the scale and then reattached to the main body. Such detachable pointers have the disadvantage that their use involves costly time consuming procedures. Accordingly, it is another object of the present invention to provide an improved indicator which when secured in position can manually be displaced to allow unobstructed placement and mounting of the scale member, and which when released will return automatically to correct position with respect to the scale member.

Also, in prior art structures, means must be included in the pointer assembly to take up play and prevent backlash between cooperative elements of the assembly. The inclusion of such means complicates the tuner assembly and adds to production costs, and it is a further object of this invention to avoid these drawbacks by providing an indicator member which eliminates the requirement for special backlash take-up means.

In a preferred embodiment of the invention the above mentioned objectives, as well as other features and advantages which will appear as the description progresses, are preferably achieved by means of a one-piece indicator member, an end portion of which forms a pointer element and another end portion of which forms a slidable pivot providing for swinging movement of the indicator member with respect to the tuner housing. The one-piece indicator member is connected at an intermediate portion to the activating means in the tuner assembly, and is constructed for sliding point contact with the tuner housing, the member being yieldably depressible to insure such contact. A scale member is adapted to be attached to the housing to underlie the pointer portion of the indicator member so as to cooperate therewith to give visual indication of the tuner setting. The one-piece indicator member is adapted to flex at its point of connection with the activating means to allow the pointer portion to be moved clear of the scale member for its mounting on the tuner housing.

The invention and its characteristic features and advantages will be more fully understood from the following description taken in conjunction with the accompanying drawing, in which:

FIGURE 1 is a front elevation of a radio-receiver provided with a tuner embodying the invention;

FIGURE 2 is an enlarged plan view of the tuner included in the radio receiver shown in FIGURE 1 and supplied with an indicator member constructed in accordance with the invention;

FIGURE 3 is an enlarged fragmentary elevational sectional view looking in the general direction of arrows 3—3 of FIGURE 2;

FIGURE 4 is a diagrammatic view illustrating the action of the indicator member mounting arrangement of the invention; and FIGURE 5 is a somewhat diagrammatic perspective view showing the manner in which the pointer member is manipulated so as not to interfere with placement and mounting of the scale member.

With more particular reference to the drawing, there is shown in FIGURE 1 a radio receiver 10 having a removable front cover 11. A combined on-off switch and volume control knob 12, and a manual tuning knob 14 are connected, respectively, to the customary control shafts 15 and 16 (shown in FIGURE 2) which shafts project through the front cover 11. The panel also has a rectangular opening 17 and a rectangular window 18, the opening 17 serving to expose a series of push-buttons 19 which are individually operable in known manner to tune the receiver automatically to preselected stations, and the window 18 serving to exhibit the tuning pointer and scale arrangement of the present invention.

As illustrated in FIGURES 2 and 3, the pointer and scale arrangement is associated with a tuner 20 included in the receiver. The tuner has a housing 21 adapted to support the tuning mechanism including rotatable control shafts 15 and 16 and a row of push button slides 22. The housing also supports and encloses indicator activating mechanism 24 and scale mounting means 25. The activating mechanism is of conventional design and includes the customary bell crank lever 26 to which an indicator member 27 is attached, and the scale mounting means includes perforated projections 28 and fasteners 30 attaching scale member 31 to the housing. A conventional push-button tuning and indicator activating mechanism of the type to which this invention is particularly adapted is disclosed in the co-pending patent application of Ralph Bray, Serial No. 246,414, filed December 21, 1962, and assigned to the assignee of the present invention. A similar construction also is disclosed in U.S. Patent No. 2,494,008, issued January 10, 1950. Briefly, each of these disclosures illustrates conventional means for connecting a bell crank with slide-type activating mechanism associated with a treadle bar actuated by pushbutton tuning means. These conventional arrangements are readily usable with the novel arched indicator member of the present invention. In the disclosure of the mentioned patent, for example, the cores 36 of coils 34 (FIGURE 1) are actuated by a slide bar (compare applicant's carriage 24) fixed to the free ends of screw threaded members attached to such cores and, as is the case in applicant's device, a bell crank is provided which has its mid-region fixed to the main framing. One end portion of this bell crank is in driving relation with the pointer, and the other end portion thereof is connected—through a spring-biased articulated link—to the aforesaid carriage which drives the core bars. Movement is imparted to the carriage in known manner, through the agency of the push-buttons and the treadle bar arrangement 50, 52, 42, which appears in FIGURES 1, 4 and 6. An arrangement of this kind is readily applicable to apparatus illustrated by the present applicant. It is only necessary to drive applicant's bell crank activating carriage 24, through the agency of a push-button and treadle bar arrangement of the known kind illustrated in the aforesaid Patent No. 2,494,008.

In particular accordance with the invention the indicator member 27 is of resilient, preferably one-piece construction and is adapted for swinging movement with respect to the housing 21. The mentioned one-piece indicator member has a forward end portion 32, a rearward end portion 33 and an intermediate portion 34 disposed between said forward end and rearward end portions. The forward end portion 32 of the one-piece indicator member is projected to provide an extension 35 constituting a pointer element 36 which overlies the forwardly facing indicia-carrying surface of scale member 31.

The rearward portion 33 of the one-piece indicator member also constitutes a sliding pivot 37 adapted to guide the indicator member in its swinging movement. For that purpose the sliding pivot 37 of the illustrated embodiment is directed downwardly and engages guide track means in the form of an elongated slot 38 in tuner housing 21. The one-piece indicator member 27 receives its motion from the activating mechanism 24 through connection means which, as shown, consists of a stud 39 and C-washer 40. The stud 39 is affixed to bell crank lever 26 of activating mechanism 24 and, as seen in FIGURE 4, passes through an aperture 41 in intermediate portion 34 of indicating member 27, and the C-washer 40 is seated in an annular groove 42 which is formed in the stud to lie immediately above and bear on the upper side of said member.

Also in accordance with the invention, three point contact is provided between the one-piece indicator member 27 and the tuner housing 21 so that the indicator member glides smoothly on said housing. For this particular purpose, the one-piece indicator member is supplied with offset means disposed on opposite sides of the aforesaid connection means, which offset means can be and preferably is in the form of three rounded protuberances 43, 44 and 45 depending from the underside of the indicator member. The protuberance 43 coincides generally with the central longitudinal axis of the indicator member and is located at a region adjacent the forward end portion 32 of said member, whereas the remaining two protuberances 44 and 45 are formed in lateral ears 46 and 47 respectively, which ears are located on opposite sides of said axis of the indicator member and at the rearward end portion 33 thereof.

The forwardly disposed protuberance 43 is elongated as shown in FIGURES 2 and 3 and ride on a raised rounded ridge 48 on tuner housing 21. In this manner the indicator member engages the housing with minimum friction and yet is positively retained against free play. To obtain this latter feature, the one-piece indicator member 27 is made preferably out of a continuous strip of stiff yet resilient material, such as phosphor bronze or similar spring metal, which strip is spaced from and extends transversely of the row of push button slides 22. The intermediate portion 34 of member 27 is arched so that, as represented in broken lines in FIGURE 4, the crest 49 of the arched portion where mounting aperture 41 is located, normally lies in a plane above annular groove 42 in mounting stud 39. In this manner and as best seen in FIGURE 4, when the indicator member 27 is mounted in operative position, its arched portion is yieldably depressed by the retaining element or C-washer 40. Thus a spring action is developed in the indicator member 27, which action effects the aforesaid three point contact, accordingly stabilizing said member 27 in its movement over tuner housing 21 and assuring its proper relation with respect to scale member 31 as in FIGURES 1, 2 and 3.

The scale member 31 shown in the drawing is a rectangular panel with graduated markings 50 (FIGURE 1) on its front face and with perforated flanges 51 (FIGURE 2) at its ends to accommodate the fasteners 30 which, as hereinbefore indicated, attach the scale member to the housing within the space confined between the row of push button slides 22 and the indicator member 27. As illustrated in diagrammatic FIGURE 5, the indicator member because of its aforementioned resiliency can be lifted by a finger of one hand to move the pointer 36 out of the way of scale member 27 while the latter is inserted in place for attachment to the housing. With the scale member in place, the indicator springs back to operative position when released so that the pointer returns to its proper relation with respect to the mounting scale member.

From the foregoing description it will be appreciated that the present invention provides a simplified tuner assembly for compact radio receivers and that the construction of this invention simplifies the ordinarily tedious task of associating the indicator and scale members with the tuner housing. Particularly it will be recognized that the utilization of the one-piece stiff resilient indicator member of the invention not only simplifies the assembly of the tuner, but moreover provides for and maintains proper alignment of the pointer with respect to the scale indicia without the use of backlash take-up springs or similar free movement eliminating means.

What I claim is:

1. In combination with a radio tuner housing having outwardly facing generally plane surface portions and provided with indicator activating mechanism, an elongated yieldable indicator member including opposite end portions and an arched portion intermediate said end portions, means connecting said arched intermediate portion of said member with said activating mechanism and providing for pivotal and translational movements of said member with said mechanism, said indicator member having bearing means in the region of each said opposite end portion providing for sliding contact between said end portions and said surface portions of said housing, said intermediate portion of said member being arched upwardly with respect to said surface portions, and said means connecting said member being effective yieldably to depress said arched intermediate portion toward said surface portions in provision of the mentioned sliding contact.

2. In the combination set forth in claim 1 in which the bearing means is in the form of three rounded protuberances, one of said protuberances coinciding generally with the central longitudinal axis of the indictor member and being located adjacent said pointer to one side of the means connecting said member with said activating mechanism, the remaining two protuberances being located on opposite sides of said axis and to the side of the connection means opposite said pointer.

3. The combination set forth in claim 1, in which the elongated indicator member consists of a continuous strip of resilient material having an arched portion with an aperture therein, the mentioned bearing means being in the form of three rounded protuberances, one of said protuberances coinciding generally with the central longitudinal axis of the strip and being located adjacent one end portion of the strip, the remaining two protuberances being located on opposite sides of said axis and adjacent the other end portion of the strip, the means connecting said member with said activating mechanism including a stud and a retaining element, the stud being affixed to the mentioned activating mechanism and having a grooved portion, the stud passing through the aperture at the arched portion of the strip, said arched portion normally lying in a plane above the grooved portion of the stud, and the retaining element being seated in said grooved portion to bear upon and yieldably depress said arched portion for resiliently urging the protuberances into contact engagement with the tuner housing.

4. In combination with a radio tuner housing provided with indicator activating mechanism, and outwardly facing surface portions an elongated yieldable indicator member adapted for swinging and translational movement with respect to the tuner housing and having forward and rearward end portions and an arched intermediate portion therebetween, the forward end portion being extended to form a pointer, means defining a pivot providing for movement of said rearward end portion of said member with respect to said tuner housing and operable to guide the indicator member in its translational and swinging movements, means connecting the arched intermediate portion of said indicator member to the aforesaid activating mechanism and operable to apply forces to said member causing said translational and said swinging movements, bearing means providing for sliding engagement between the indicator member and the recited surface portions of said tuner housing as the member is caused to move, the intermediate portion of the indicator member being arched away from said housing surface portions and the means for connecting being effective yieldably to depress said arched portion toward said housing surface portions in provision of the aforesaid mentioned sliding engagement, and a scale on the housing underlying the pointer-forming portion of the indicator member.

5. The combination as set forth in claim 4 in which the tuner housing is further provided with a row of push button slides and the indicator member consists of a continuous strip of stiff resilient material spaced from and extending transversely of the row of push button slides and having its end portion forming a pointer extending across the space between said member and slides, the scale being a rectangular panel occupying said space, the means connecting the member with the activating mechanism being disposed remotely from the pointer forming portion of the strip the latter being adapted to be flexed manually away from said surface portions to displace the pointer whereby to clear the scale for placement within said space and for attachment to the scale mounting means on the housing.

References Cited by the Examiner
UNITED STATES PATENTS

| | | | |
|---|---|---|---|
| 1,438,829 | 12/1922 | Howell | 346—139 |
| 2,273,946 | 2/1942 | Fichter | 116—124.1 |
| 2,281,093 | 3/1942 | Benton et al. | 116—124.1 |
| 2,333,355 | 11/1943 | Benton et al. | 116—124.1 |
| 2,875,620 | 3/1959 | Heselwood | 334—7 |

LOUIS J. CAPOZI, *Primary Examiner.*